United States Patent
Mansfield

(10) Patent No.: US 8,774,976 B2
(45) Date of Patent: Jul. 8, 2014

(54) METHOD AND SYSTEM FOR REDUCING PEAK LOAD CHARGE ON UTILITY BILL USING TARGET PEAK LOAD AND COUNTERMEASURES

(75) Inventor: Carl Mansfield, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/484,518

(22) Filed: May 31, 2012

(65) Prior Publication Data

US 2013/0325197 A1 Dec. 5, 2013

(51) Int. Cl.
G06F 1/26 (2006.01)

(52) U.S. Cl.
USPC .................... 700/291; 700/295; 700/286

(58) Field of Classification Search
USPC ......................................... 700/291
See application file for complete search history.

(56) References Cited

U.S. PATENT DOCUMENTS

| | | | |
|---|---|---|---|
| 5,880,536 A | 3/1999 | Mardirossian | |
| 6,785,592 B1 | 8/2004 | Smith et al. | |
| 7,069,161 B2 | 6/2006 | Gristina et al. | |
| 7,274,975 B2 | 9/2007 | Miller | |
| 7,313,465 B1 * | 12/2007 | O'Donnell | 700/291 |
| 7,698,233 B1 * | 4/2010 | Edwards et al. | 705/412 |
| 7,873,441 B2 | 1/2011 | Synesiou et al. | |
| 8,072,187 B2 * | 12/2011 | Wu et al. | 320/140 |
| 8,200,372 B2 * | 6/2012 | Joos et al. | 700/292 |
| 8,415,830 B2 * | 4/2013 | Lim et al. | 307/41 |
| 8,417,391 B1 * | 4/2013 | Rombouts et al. | 700/291 |
| 2002/0194113 A1 * | 12/2002 | Lof et al. | 705/37 |
| 2004/0098142 A1 * | 5/2004 | Warren et al. | 700/22 |
| 2005/0234600 A1 * | 10/2005 | Boucher et al. | 700/286 |
| 2006/0122738 A1 | 6/2006 | Yamada et al. | |
| 2007/0005192 A1 * | 1/2007 | Schoettle et al. | 700/286 |
| 2007/0021874 A1 * | 1/2007 | Rognli et al. | 700/295 |
| 2007/0198387 A1 * | 8/2007 | Uenohara et al. | 705/36 R |
| 2009/0094173 A1 * | 4/2009 | Smith et al. | 705/412 |
| 2009/0276651 A1 * | 11/2009 | Conroy et al. | 713/340 |
| 2010/0179704 A1 * | 7/2010 | Ozog | 700/291 |
| 2010/0191385 A1 * | 7/2010 | Goodnow et al. | 700/291 |
| 2010/0217550 A1 * | 8/2010 | Crabtree et al. | 702/62 |
| 2011/0061015 A1 * | 3/2011 | Drees et al. | 715/771 |
| 2011/0071882 A1 * | 3/2011 | Jakagnanam et al. | 705/10 |
| 2011/0140667 A1 * | 6/2011 | Moon | 320/134 |
| 2011/0178977 A1 | 7/2011 | Drees | |
| 2011/0231028 A1 * | 9/2011 | Ozog | 700/291 |
| 2011/0313585 A1 | 12/2011 | Park | |
| 2012/0072039 A1 * | 3/2012 | Anderson et al. | 700/291 |
| 2012/0185106 A1 * | 7/2012 | Ghosh et al. | 700/291 |
| 2012/0197449 A1 * | 8/2012 | Sanders | 700/291 |
| 2013/0030590 A1 * | 1/2013 | Prosser | 700/295 |
| 2013/0073273 A1 * | 3/2013 | Madrazo et al. | 703/13 |

\* cited by examiner

*Primary Examiner* — Ryan Jarrett
*Assistant Examiner* — Michael J. Scapin
(74) *Attorney, Agent, or Firm* — Scot A. Reader

(57) ABSTRACT

A peak load management system and method take countermeasures to reduce the risk of a spike in grid power use above a target peak load due to battery exhaustion. The countermeasures replace or at least reduce the safety margins built into target peak load peak load management systems and increase the cost savings realized from peak load management.

16 Claims, 8 Drawing Sheets

METHOD AND SYSTEM FOR REDUCING PEAK LOAD CHARGE ON UTILITY BILL USING TARGET PEAK LOAD AND COUNTERMEASURES

BACKGROUND OF THE INVENTION

The present invention relates to power management and, more particularly, managing the peak load drawn by a site owner on an electric utility to reduce the site owner's utility bills.

Utility bills often include a peak load component that assesses a site owner a charge based on the peak usage of grid power at the site during a multi-day billing period.

To reduce the amount of the peak load charge, it is known to deploy a peak load management system that continually measures load at the site throughout the billing period and limits the use of grid power to a target peak load. The target peak load is often statically configured for the billing period, either manually or by an algorithm running on the management system. Whenever the measured load reaches the target peak load during the billing period, the management system discharges stored power from a battery system to keep the use of grid power from exceeding the target peak load. Once the measured load falls below the target peak load, the management system stops discharging stored power from the battery system and the battery system is recharged.

A shortcoming of known peak load management systems is that the target peak load is often configured at a level that is suboptimal. A suboptimal target peak load setting can result from errors in estimating the site owner's power consumption, power generation (e.g., solar output), or both. If the target peak load is set too low, the stored power in the battery system may be exhausted before the measured load falls below the target peak load and the use of grid power may spike above the target peak load, decimating the cost savings from peak load management. On the other hand, if the target peak load is set too high, the use of grid power is permitted to rise above a level that could be successfully offset the battery system, resulting in an underutilization of the battery system that unduly limits the cost savings from peak load management.

One known way to reduce the risk of a spike of grid power use above the target peak load due to battery exhaustion is to build a safety margin into the target peak load. This can be done using various approaches. In one approach, the target peak load is set a predetermined amount above a level where the battery system can successfully offset the predicted peak power use on the "worst case" day of the billing period. An exemplary target peak load with a built-in safety margin is shown in FIG. 1. In the illustrated example, the line at 65 kilowatts, a 10 kilowatt reduction from the expected peak of 75 kilowatts, represents the level where the battery system can successfully offset the predicted peak power use on the "worst case" day of the billing period. The target peak load is set to 67 kilowatts, 2 kilowatts less of a reduction, which provides about a 20% safety margin. In another approach, the predicted peak power use on the "worst case" day of the billing period is padded by a predetermined amount, and the target peak load is set to a level where the battery system can successfully offset the predicted peak power use after padding. In a third approach, the target peak load is set to a level where less than all of the stored power of the battery system is needed to successfully offset the predicted peak power use on the "worst case" day of the billing period.

Unfortunately, building a safety margin into the target peak load does not completely eliminate the risk of a spike above the target peak load due to battery exhaustion. For example, as shown in FIG. 2, if the measured (actual) load substantially exceeds the predicted load on the "worst case" day of the billing period, the stored power in the battery system may be exhausted before the measured load falls below the target peak load, causing the use of grid power to spike above the target peak load despite the built-in safety margin. Such a spike on a single day of the billing cycle can cause a significant increase in the peak load component of the site owner's utility bill and render the peak load management system largely ineffectual. Moreover, building a safety margin into the target peak load has further downside in allowing the peak use of grid power to rise above a level which could potentially be successfully offset by the battery system, which reduces the cost savings achieved by the management system.

SUMMARY OF THE INVENTION

The present invention provides a peak load management system and method that implement countermeasures to reduce the risk of a spike in grid power use above a target peak load due to battery exhaustion. The countermeasures of the present invention eliminate or at least reduce the safety margins built into target peak load peak load management systems and increase the cost savings realized from peak load management.

In one aspect of the invention, a peak load management system comprises a battery system configured to store power and discharge stored power when actual load exceeds a target peak load; and a peak load management processor operatively coupled with the battery system and configured to continually measure actual load, determine predicted load data based at least in part on past actual load, determine actual load data based at least in part on present actual load, determine a risk of a spike in grid power use above the target peak load due to battery exhaustion based at least in part on the predicted load data and the actual load data and selectively implement one or more countermeasures to reduce the risk based at least in part on a level of the risk.

In some embodiments, the risk is determined based at least in part on a comparison of an actual time when actual load rises above the target peak load with a predicted time when actual load is expected to rise above the target peak load.

In some embodiments, the risk is determined based at least in part on a comparison of an actual time when actual load reaches an actual maximum load with a predicted time when actual load is expected to reach an actual maximum load.

In some embodiments, the risk is determined based at least in part on a comparison of an actual time when actual load reaches a predicted maximum load with a predicted time when actual load is expected to reach a predicted maximum load.

In some embodiments, the risk is determined based at least in part on a comparison of actual load at a particular time when actual load is above the target peak load and below a predicted maximum load with a predicted load at the particular time.

In some embodiments, the risk is determined based at least in part on a comparison of an actual maximum load with a predicted maximum load.

In some embodiments, the risk is determined based at least in part on present actual load, a present rate of change of actual load and a present state of battery charge.

In some embodiments, the countermeasures include increasing the target peak load.

In some embodiments, the countermeasures include shedding actual load.

In some embodiments, the risk includes a probability component estimating a likelihood of a spike in grid power use above the target peak load due to battery exhaustion.

In some embodiments, the risk includes a severity component estimating an amplitude of a spike in grid power use above the target peak load due to battery exhaustion.

In another aspect of the invention, in a peak load management system comprising a battery system configured to store power and discharge stored power when actual load exceeds a target peak load and a peak load management processor operatively coupled with the battery system, a peak load management method comprises the steps of continually measuring by the management system actual load; determining by the management system predicted load data based at least in part on past actual load; determining by the management system actual load data based at least in part on present actual load; determining by the management system a risk of a spike in grid power use above the target peak load due to battery exhaustion based at least in part on the predicted load data and the actual load data; and selectively implementing by the management system one or more countermeasures to reduce the risk based at least in part on a level of the risk.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
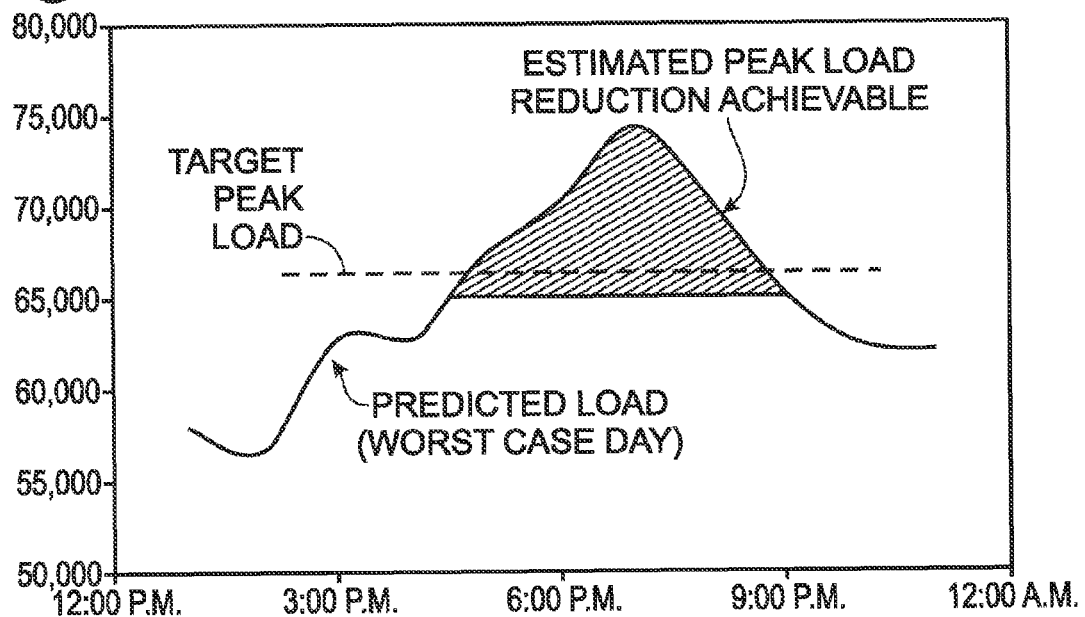
FIG. 1 is a load-time diagram showing a target peak load having a built-in safety margin in a conventional peak load management system.
Figure 2:
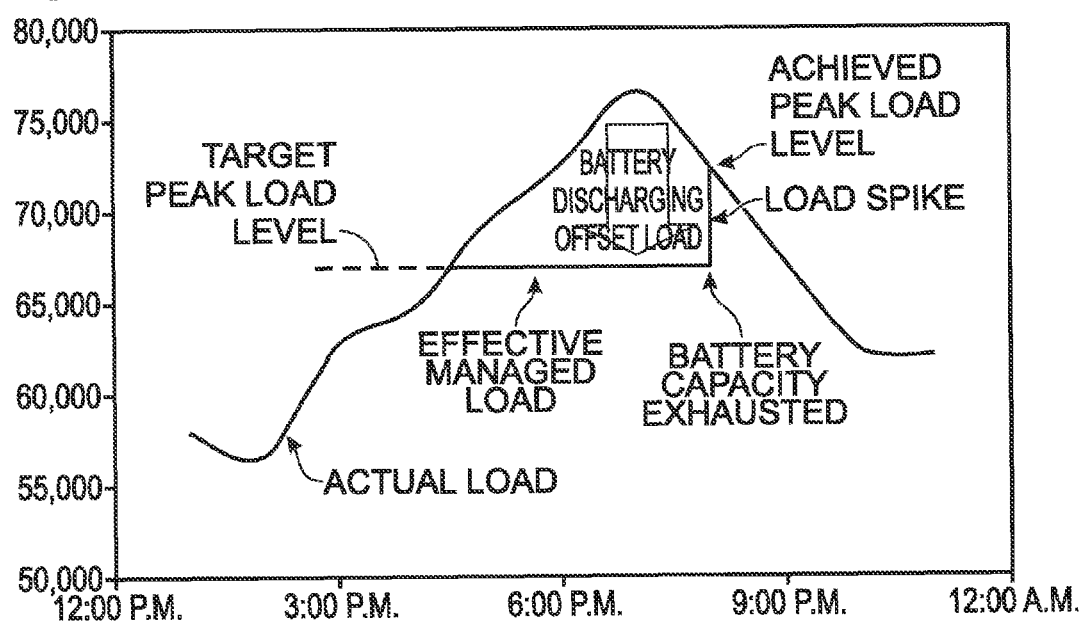
FIG. 2 is a load-time diagram showing a spike in grid power use above a target peak load having a built-in safety margin due to battery exhaustion in a conventional peak load management system.
Figure 3:
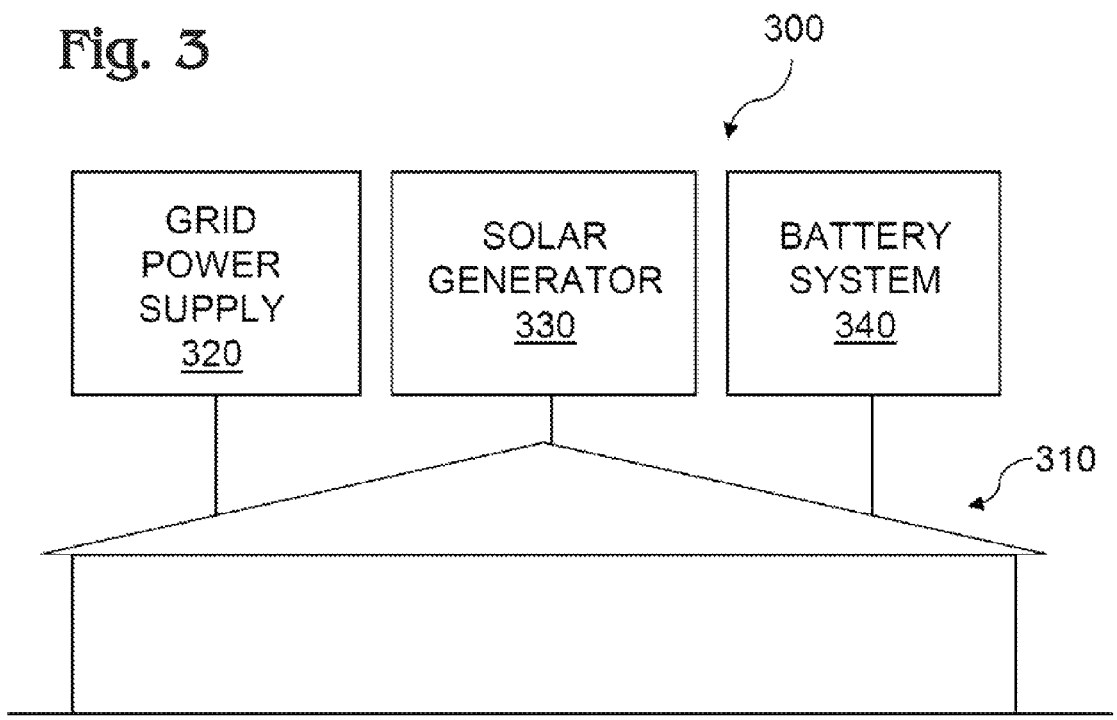
FIG. 3 shows a power system for a site.
Figure 4:
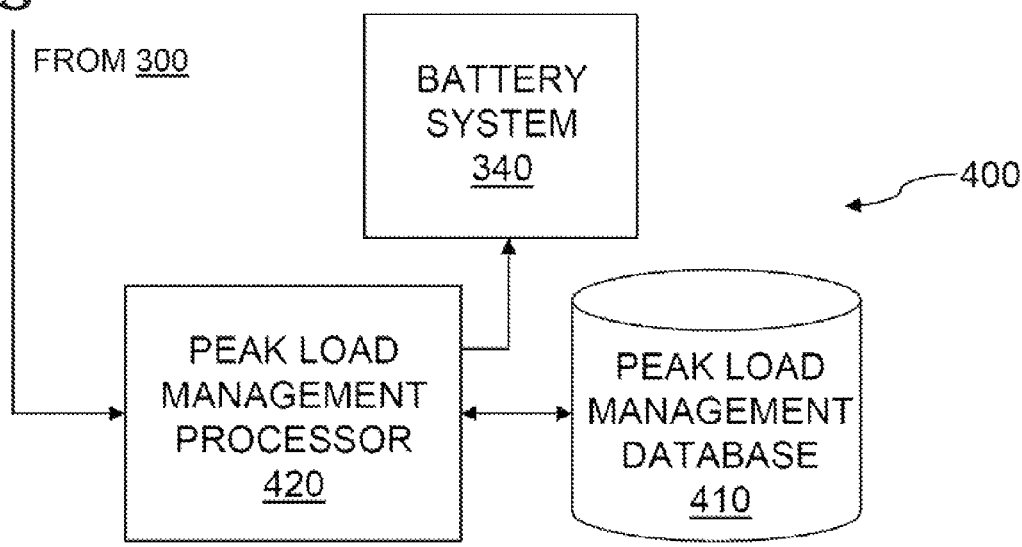
FIG. 4 shows a peak load management system for the site.

FIG. 3 shows a power system 300 for a site 310 operated by a site owner who is a customer of an electric utility. Power system 300 includes multiple power sources that supply power to site 310 at various times and in various amounts. The power sources include a grid power supply 320 drawn on the electric utility. The electric utility that supplies the grid power bills the site owner periodically, such as monthly, for grid power. These periodic electric utility bills include a peak load component that assesses the site owner a charge based on the peak usage of grid power at site 310 during the billing period. The power sources also include a solar generator 330 that supplies power to site 310 during daylight hours, at least partially offsetting the use of grid power. The power sources further include a battery system 340 that stores power and discharges stored power to site 310 only when actual load drawn by site 310 exceeds a target peak load. Referring now to FIG. 3 and FIG. 4, to reduce the peak load charge on the site owner's utility bills, a peak load management system 400 deployed at site 310 continually measures actual load drawn by site 310 during the billing period and causes battery system 340 to release stored power as needed to cap usage of grid power at the target peak load. Management system 400 also implements countermeasures to reduce the risk of a spike in grid power use above the target peak load due to battery exhaustion. Battery system 340 includes one or more batteries that are recharged at non-peak times using grid and/or solar power.

In some embodiments, a power system for a site includes a different type of generator, such as a diesel generator or wind turbine, in lieu of or in addition to a solar generator. In still other embodiments, a power system for a site does not include any type of generator.

Management system 400 includes a peak load management database 410, a peak load management processor 420 and battery system 340.

Management database 410 is a data repository managed by management processor 420. Management database 410 stores data pertaining to actual load drawn on power system 300 and predicted load expected to be drawn on power system 300, as well as data pertaining to the charge state of battery system 340 and the target peak load.

Management processor 420 receives configuration data inputted into management system 400, such as site operations data, weather data, the energy capacity of battery system 340 and the safety margin, if any, to be built into the target peak load. Management processor 420 continually measures actual load drawn on power system 300. Actual load is a net load representing the power drawn on grid power supply 320 and battery system 340 reduced by the power supplied by solar generator 330. Measurements of actual load are taken for each time increment (e.g., one minute) for each day of each billing period. Management processor 420 computes predicted load data relative to a predicted load expected be drawn on power system 300 on the "worst case" day of the billing cycle from past actual load, the energy capacity of battery system 340 and supplemental data such as site operations data, weather data and seasonal, weekly and daily trend data. The predicted load is a net load representing the power expected to be drawn on grid power supply 320 and battery system 340 reduced by the power expected to be supplied by solar generator 330. The predicted load data include the target peak load and other parametric values often comprising time-of-day and power level values. The "worst case" day of the billing period is the day expected to have the largest peak load as determined by predicted peak height and width. Management processor 420 stores the configuration data, actual load (and related parametric values), the predicted load data (including the target peak load and other parametric values) in management database 410. Management processor 420 also continually measures and stores in management database 410 the charge of battery system 340 and the current output power of battery system 340. Management processor 420 further regulates the discharge of stored power from battery system 340 when actual load exceeds the target peak load to prevent grid power use from exceeding the target peak load. In some embodiments, management processor 420 is a general purpose processor that performs its functions by executing software instructions, although management processor 420 may perform functions in custom logic.

Figure 5:
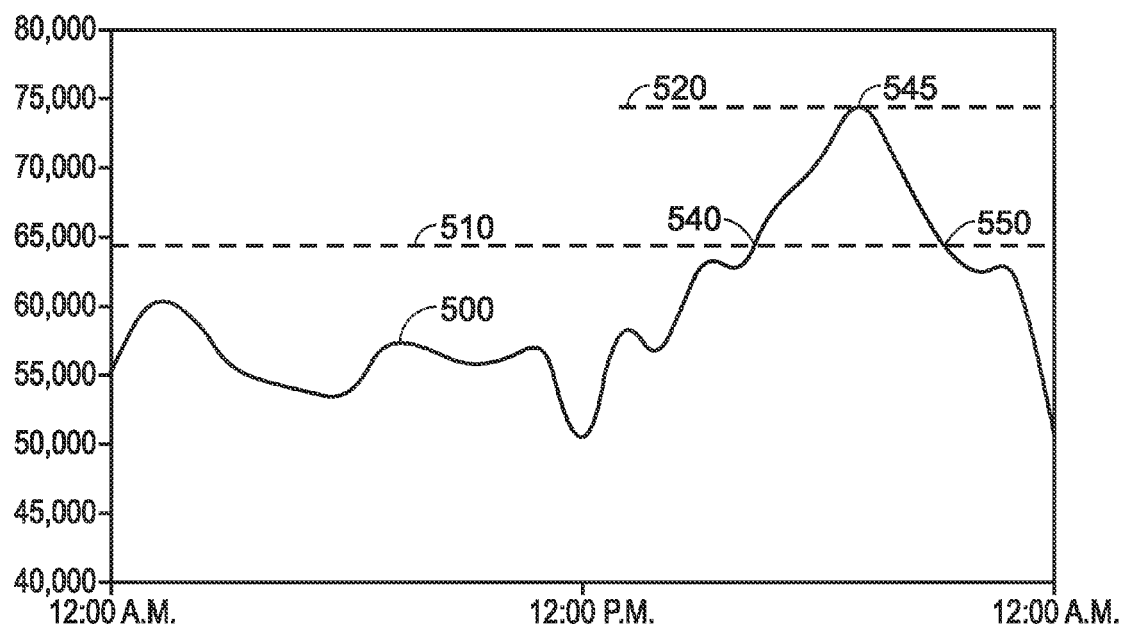
FIG. 5 is an exemplary load-time diagram showing predicted load at the site.

FIG. 5 is an exemplary load-time diagram showing predicted load 500 at site 310 on the "worst case" day of the billing period. The Y-axis is the predicted load in kilowatts and the X-axis is the time of day. Predicted load 500 represents the expected net load. Predicted load 500 includes values for predicted load data parameters germane to peak load management, including the target peak load ($P_t$) 510, the predicted time when actual load is expected to rise above the target peak load ($t_{ps}$) 540, the predicted time when actual load is expected to fall below the target peak load ($t_{pe}$) 550, the predicted time when actual load is expected to reach a maximum ($t_{max}$) 545 and the predicted maximum load ($P_p$) 520.

In some embodiments, the predicted load data may include values for fewer than all of the above parameters. For example, the predicted peak load data may include values for $t_{ps}$ and $t_{pe}$, but not $t_{max}$. Alternatively, the predicted peak load data may include values for $t_{ps}$ and $t_{max}$, but not $t_{pe}$. Moreover, the predicted peak load data may not include a value for $P_p$.

From the determined values shown in FIG. 5, management processor 420 computes values for additional predicted load data parameters germane to peak load management. First, management processor 420 computes the predicted average discharge power of battery system 340 ($BP_{av}$) when actual load exceeds $P_t$. The average discharge power is computed according to $$BP_{av}=B_c/(t_{pe}-t_{ps})$$

where $B_c$ is the effective energy capacity of battery system 340. Second, management processor 420 computes a predicted fill factor (F) between zero and one representative of how rapidly the peak is expected to rise above $P_t$ after $t_{ps}$ and/or how late the peak drops down to $P_t$ before $t_{pe}$. For example, a hypothetical square shaped peak which rises immediately to $P_p$ at $t_{ps}$ and remains there until $t_{pe}$ would have a fill factor of one. More realistic shaped peaks have a lower fill factor. The fill factor is computed according to $$F=BP_{av}/(P_p-P_t).$$

Figure 6:
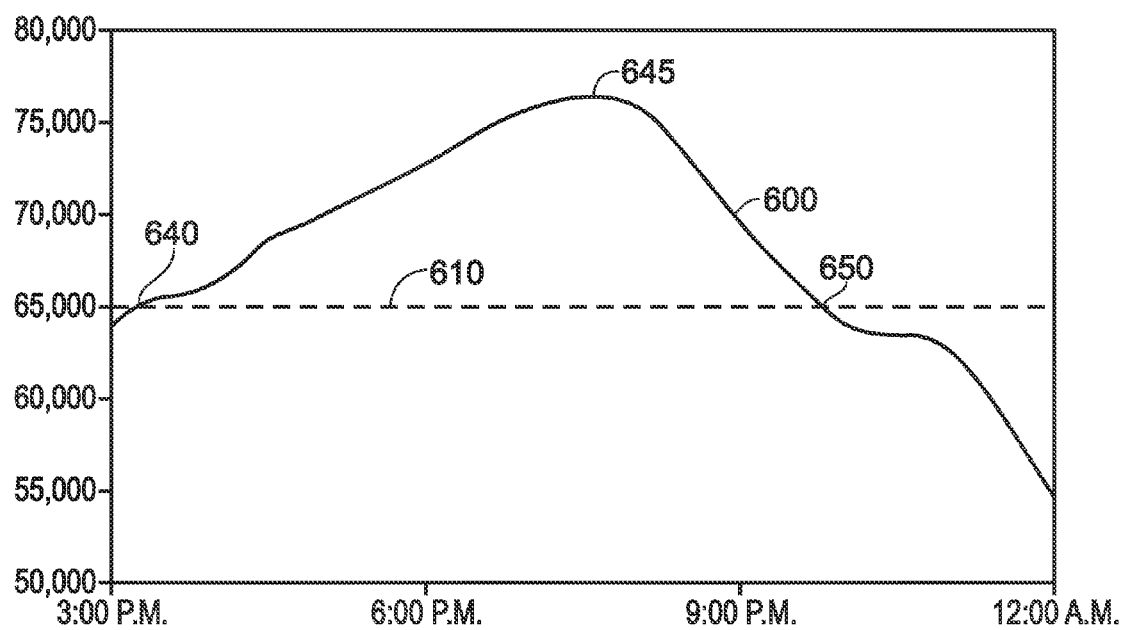
FIG. 6 is an exemplary load-time diagram showing actual load at the site.

FIG. 6 is an exemplary load-time diagram showing present actual load [L(t)] 600 at site 310 on a given day of the billing period. The Y-axis is the actual load in kilowatts and the X-axis is the time of day. Actual load 600 represents the measured net load at each time increment. Actual load below the target peak load 610 is met by grid power supply 320 whereas actual load above target peak load 610 is met by battery system 340. Management processor 420 determines in real-time values for actual load data parameters germane to peak load management, including the actual time when the actual load rises above the target peak load ($T_{as}$) 640, the actual time when the actual load falls below the target peak load ($T_{ae}$) 650 and the actual time when the actual load reaches a maximum ($T_{am}$) 645.

In addition to the real-time values shown in FIG. 6, management processor 420 determines in real-time values for two additional parameters germane to peak load management, namely, present battery charge [B(t)] and present rate of change of actual load [ΔL(t)].

Transitory spikes in actual load are generally not counted by an electric utility for peak load billing purposes. For example, a 30-second rise in actual load typically would not generally constitute a actual peak of sufficient duration to be counted by the electric utility for billing purposes. Accordingly, in some embodiments, L(t) is smoothed prior to application to prevent transitory spikes in load from impacting peak load management operations. L(t) smoothing may be achieved in various ways, which may be implemented alone or in combination. First, L(t) may be computed as a moving average over a configurable time. Second, L(t) may be required to remain above (or below) a peak management threshold (e.g., $P_t$) for a sustained period (e.g., 10 minutes) before the threshold condition is deemed to be met. Third, L(t) may be required to be above (or below) a peak management threshold (e.g., $P_t$) by a predetermined amount (e.g., 2 kW) before the threshold condition is deemed to be met.

Figure 7:
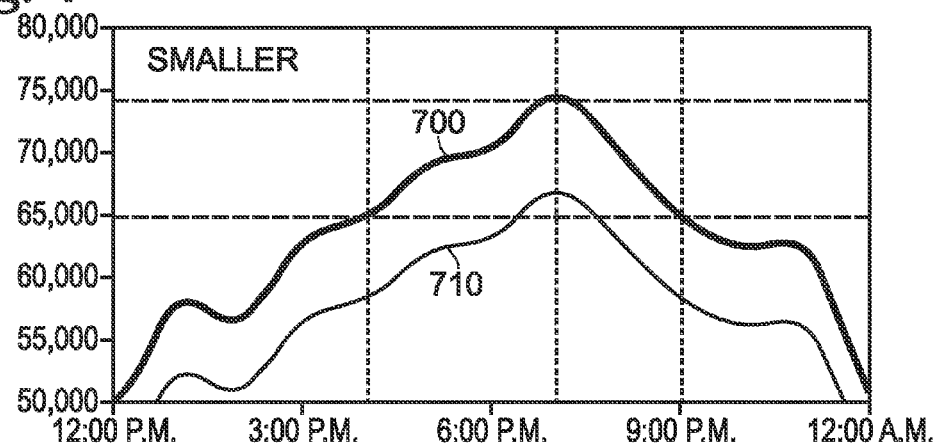
FIG. 7 is an exemplary load-time diagram showing actual load at the site that is smaller than predicted load.

Peak load management system 400 takes countermeasures to reduce the risk of spikes in grid power use above $P_t$ due to battery exhaustion (hereinafter called "peak violations"). To assess peak violation risks, management processor 420 compares in real-time actual load data [L(t), $T_{as}$, $T_{ae}$, $T_{am}$, ΔL(t)] and battery charge data [B(t)] with predicted load data ($P_t$, $t_{ps}$, $t_{ps}$, $t_{pe}$, $P_p$, $BP_{av}$, F). Whenever management processor 420 determines that actual load and battery charge data deviate from predicted load data in a manner that creates an unacceptable risk of a peak violation, a countermeasure is taken. FIGS. 7-12 illustrate six ways that actual load can deviate from predicted load, the last three of which pose a risk of peak violation. FIG. 7 is an exemplary load-time diagram showing an actual load 710 at site 310 that is at all times smaller than predicted load 700. As the actual peak is both shorter and narrower than the expected peak, the amount of power consumed above the target peak load is less than expected. The charge of battery system 340 is not fully utilized and there is no risk of peak violation.

Figure 8:
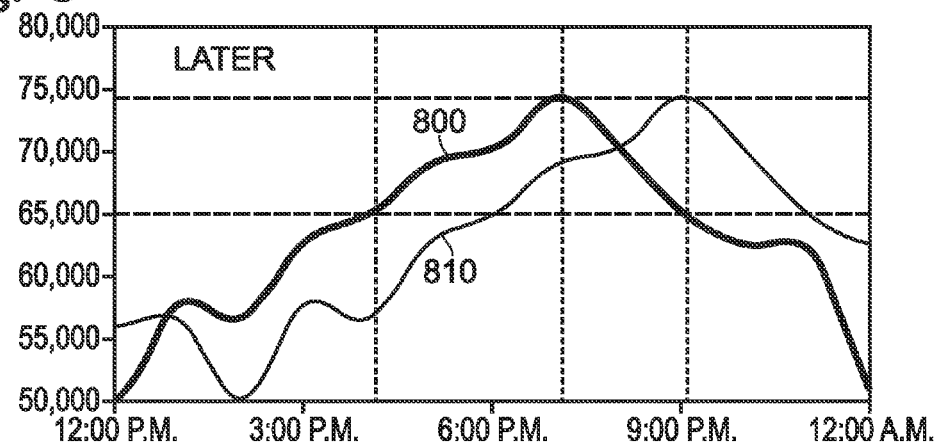
FIG. 8 is an exemplary load-time diagram showing actual load at the site that is later than predicted load.

FIG. 8 is an exemplary load-time diagram showing an actual load 810 at site 310 that is later than predicted load 800. While the actual peak is later than the expected peak, the amount of power consumed above the target peak load is the same as expected. Thus, the charge of battery system 340 is not overutilized and there is no risk of peak violation.

Figure 9:
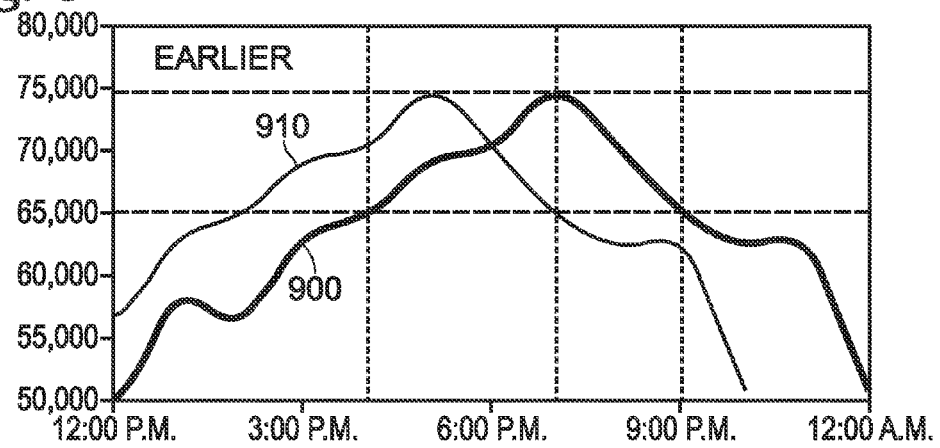
FIG. 9 is an exemplary load-time diagram showing actual load at the site that is earlier than predicted load.

FIG. 9 is an exemplary load-time diagram showing an actual load 910 at site 310 that is earlier than predicted load 800. While the actual peak is earlier than the expected peak, the amount of power consumed above the target peak load is the same as expected. Thus, the charge of battery system 340 is not overutilized and there is no risk of peak violation.

Figure 10:
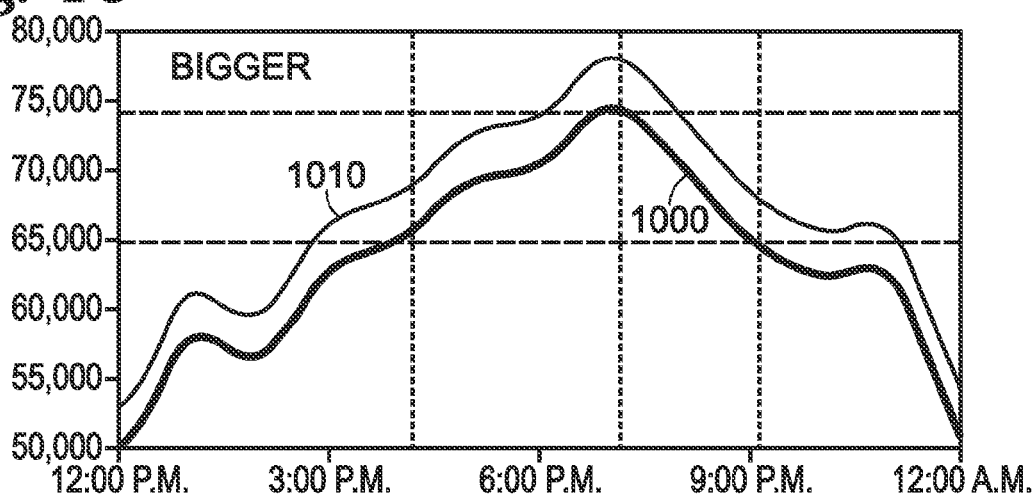
FIG. 10 is an exemplary load-time diagram showing actual load at the site that is bigger than predicted load.

FIG. 10 is an exemplary load-time diagram showing an actual load 1010 at site 310 that is larger than predicted load 1000. As the actual peak is both taller and wider than the expected peak, the amount of power consumed above the target peak load is greater than expected. The charge of battery system 340 is overutilized and there is a risk of peak violation.

Figure 11:
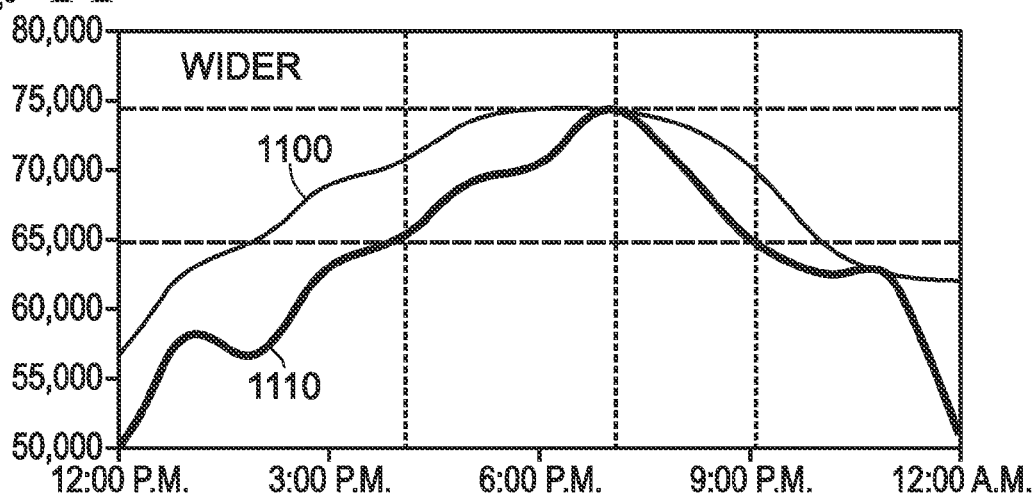
FIG. 11 is an exemplary load-time diagram showing actual load at the site that is wider than predicted load.

FIG. 11 is an exemplary load-time diagram showing an actual load 1100 at site 310 that is wider than predicted load 1110. The actual peak is the expected height but is wider than expected. Thus, the amount of power consumed above the target peak load is greater than expected. The charge of battery system 340 is overutilized and there is a risk of peak violation.

Figure 12:
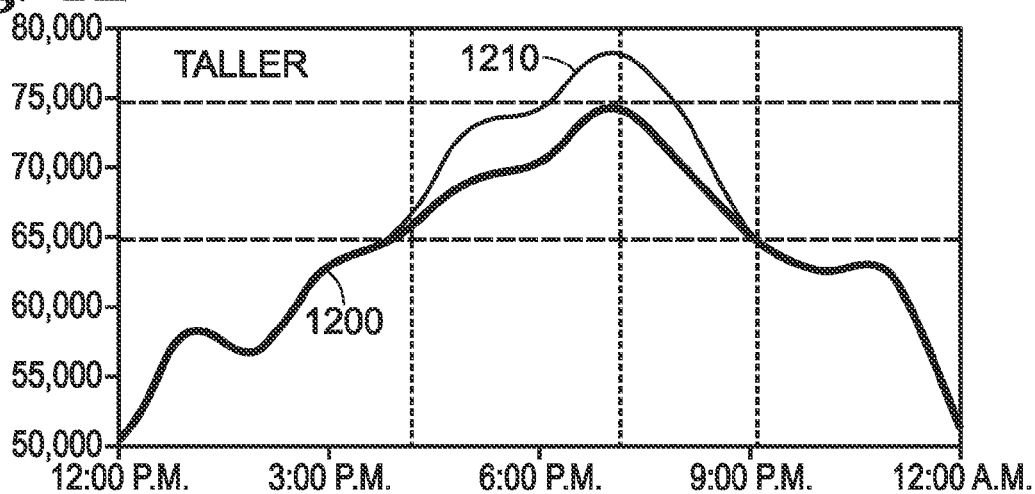
FIG. 12 is an exemplary load-time diagram showing actual load at the site that is taller than predicted load.

FIG. 12 is an exemplary load-time diagram showing an actual load 1210 at property 310 that is taller than predicted load 1200. The actual peak has the expected width but is taller than expected. Thus, the amount of power consumed above the target peak load is greater than expected. The charge of battery system 340 is overutilized and there is a risk of peak violation.

Figure 13:
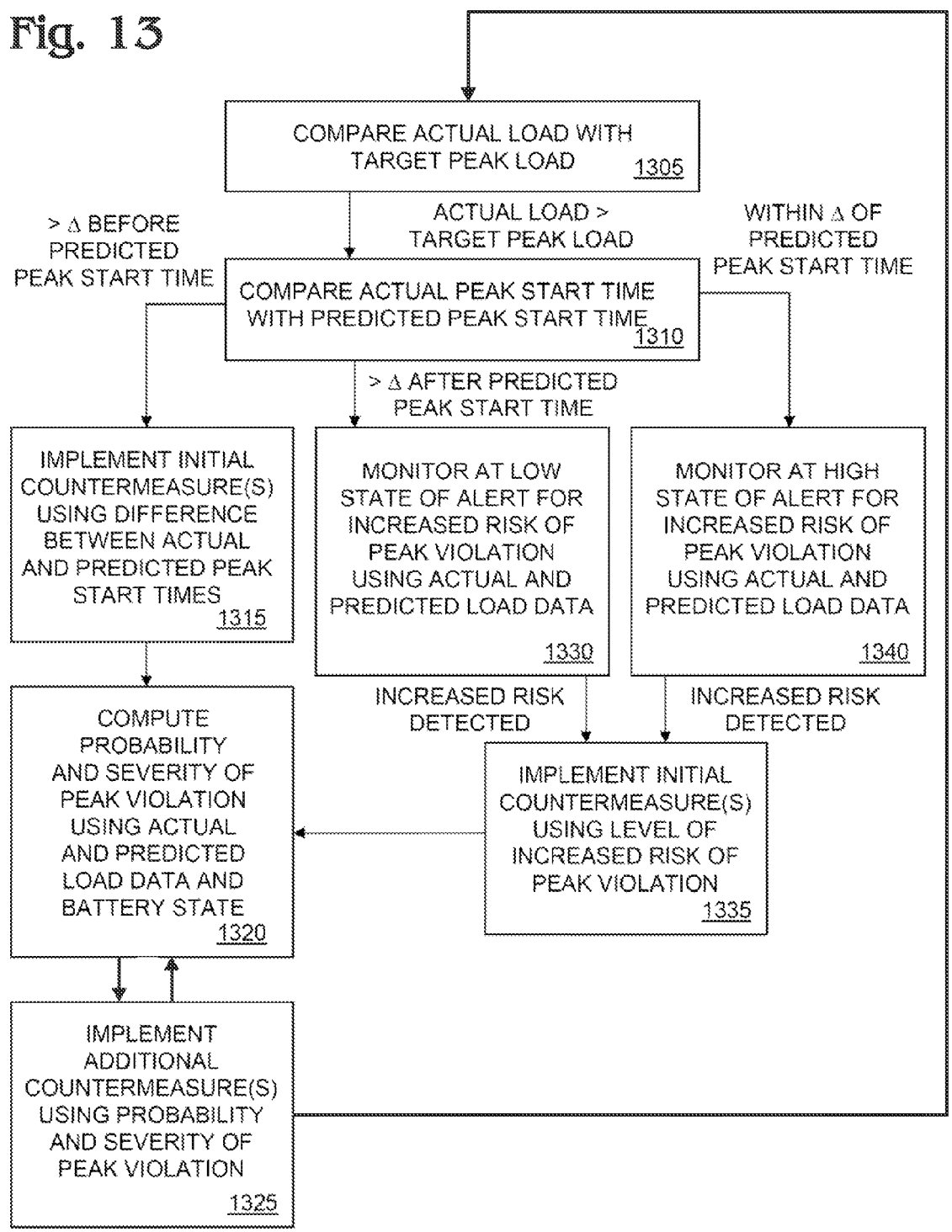
FIG. 13 shows a peak load management method.

Turning now to FIG. 13, a peak load management method performed by peak load management system 400 is shown. The method is performed after management processor 420 has determined and computed the "worst case" predicted load data germane to peak management for the current utility billing period ($P_t$, $t_{ps}$, $t_{max}$, $t_{pe}$, $P_p$, $BP_{av}$, F). These data are stored in management database 410.

At the outset, management processor 420 compares $L(t)$ with $P_t$ (1305). Management processor 420 performs this comparison in loop until $L(t)$ is found to exceed $P_t$. Once $L(t)$ is found to exceed $P_t$, management processor 420 compares $T_{as}$ with $t_{ps}$ (1310). If $T_{as}$ is more than a configurable interval (A) before $t_{ps}$, there is a high probability that the actual peak on the day in question will be larger or wider than the predicted peak, as in FIG. 10 or FIG. 11, such that a peak violation is likely to occur unless countermeasures are taken. Accordingly, management processor 420 enters an active management state.

In the active management state, management processor 420 implements initial countermeasures based on the difference between $T_{as}$ and $t_{ps}$ (1315). Initial countermeasures may include raising $P_t$ and/or shedding actual load at site 310. It is important to note that, whenever $P_t$ is raised by the management processor 420, the new value of $P_t$ is stored in management database 410. This new value for $P_t$ is used immediately in operation of the peak load management system. In certain embodiments, whenever $P_t$ is adjusted in this manner, other parameters ($t_{ps}$, $t_{pe}$, $t_{max}$, etc.) may also be updated as a result of the measured actual peak on the day when $P_t$ is updated. Shedding actual load may be accomplished, for example, by shutting down fountains or setting thermostats on air conditioners to higher temperatures. The magnitude of initial countermeasures correlates directly with the amount of time by which $T_{as}$ precedes $t_{ps}$. In other embodiments, the flow proceeds to Step 1320 without taking initial countermeasures.

Management processor 420 next calculates the risk of a peak violation using $L(t)$, $\Delta L(t)$, $B(t)$ and predicted load data (1320). A combination of measured and computed values are used to calculate both the likelihood that $B(t)$ will be exhausted before $L(t)$ drops below $P_t$ and the amplitude of the spike above $P_t$ that will follow in the event battery exhaustion occurs. The calculated risk thus includes a probability component and a severity component. The probability component estimates how likely a spike in grid power usage above the target peak load due to battery exhaustion is to occur, whereas the severity component estimates the amplitude of such a spike if it does occur, that is, how much the new peak load will exceed the target peak load in the event of a spike.

By way of example, the risk of a peak violation may be calculated using measured values of $L(t)$, $\Delta L(t)$, $B(t)$ at one or more of the following times:
1. at $t_{ps}$;
2. at $t_{max}$;
3. at $t_{pe}$;
4. at one or more intermediate rising times ($t_r$) between $t_{ps}$ and $t_{max}$, weighted by F, wherein multiple measurements are realized by assigning different values to γ1 and γ2, according to $t_r = t_{ps} + (t_{max} - t_{ps})((1-F)γ1 + γ2);$ 5. at one or more intermediate falling times ($t_f$) between $t_{max}$ and $t_{pe}$, weighted by F, wherein multiple measurements are realized by assigning different values to γ3 and γ4, according to $t_f = t_{max} + (t_{pe} - t_{max})((1-F)γ3 + γ4);$ 6. at a time when $L(t)$ equals $P_t$;
7. at one or more times when $L(t)$ equals $P_t$ multiplied by a scaling factor that can optionally include F, wherein multiple measurements are realized by assigning different values to scaling component γ5, according to $L(t) = γ5(P_t)(F);$ 8. at a time when $L(t)$ equals $P_p$;
9. at one or more times when $L(t)$ equals $P_p$ multiplied by a scaling factor that can optionally include F, wherein multiple measurements are realized by assigning different values to scaling component γ6, according to $L(t) = γ6(P_p)(F);$ 10. at one or more times when $L(t)$ exceeds $P_t$ by the difference between $P_p$ and $P_t$ multiplied by a scaling factor that can optionally include F, wherein multiple measurements are realized by assigning different values to scaling component γ7, according to $L(t) - P_t = γ7(P_p - P_t)(F);$ 11. at a time when a maximum value for $L(t)$ has been recorded, $T_{am}$, calculated such that this maximum has been maintained for a configurable minimum period of time.

In addition to the above measured values, the risk of a peak violation may be calculated using computed values for one or more of the following parameters:

12. the width of the predicted peak ($W_{pt}$), according to $W_{pt} = t_{pe} - t_{ps};$ 13. the width of predicted peak rising period ($W_{pr}$), according to $W_{pr} = t_{max} - t_{ps};$ 14. $W_{pr}$ as a percentage of $W_{pt}$;
15. the width of predicted peak falling period ($W_{pf}$), according to $W_{pf} = t_{pe} - t_{max};$ 16. $W_{pf}$ as a percentage of $W_{pt}$;
17. the height of the predicted peak ($H_p$) above the target peak, according to $H_p = P_p - P_t;$ 18. $H_p$ as a percentage of $P_t$;
19. $H_p$ as a percentage of $P_p$;
20. The fill factor for the actual peak, calculated in real time, $F_{act}$.

Management processor 420 takes additional countermeasures based on the probability and severity components of the calculated risk (1325). The additional countermeasures may include raising $P_t$ by an additional amount and/or shedding additional actual load at site 310. The magnitude of additional countermeasures correlates directly with the probability and severity components of the calculated risk. Whenever a countermeasure is taken that causes adjustment to parameters such as $P_t$, management processor 420 recomputes the probability and severity components of calculated risk.

Finally, management processor 420 detects the completion of the peak event, corresponding to the time when $L(t)$ has dropped below $P_t$ either for a sufficient period of time, or by a sufficient power margin, whereupon the peak event for the day can be considered to have concluded. At that time, management processor 420 returns to comparing actual load with target peak load, at Step 1305, awaiting commencement of the next peak event.

Returning now to Step 1310, if $T_{as}$ is more than $\Delta$ after $t_{ps}$, there is a high probability that the actual peak on the day in question will be smaller than the predicted peak, as in FIG. 7, such that a peak violation is unlikely to occur. In that event, management processor 420 does not take immediate countermeasures and enters a conservative state of observation wherein management processor 420 monitors at a low state of alert for an increased risk of peak violation using $L(t)$, the present time $(t)$, and predicted load data (1330).

In the conservative state of observation, $L(t)$ and $t$ are compared at various times against a set of thresholds and the results are combined in a Boolean operation to determine whether the risk of peak violation has increased. By way of example, one or more of the following thresholds may be included in the set:

1. $L(t)$ versus $P_p$, tuned by a scaling factor ($\alpha 1$), which is violated if $$L(t) > P_p(\alpha 1);$$

2. $L(t)$ versus an actual load between $P_t$ and $P_p$, weighted by F and tuned by a scaling factor ($\alpha 2$), which is violated if $$L(t) > P_p + F(P_t - P_p)(\alpha 2);$$

3. $t$ versus $T_{am}$, which is violated if $$t < T_{am};$$

4. $t$ versus $t_{max}$, tuned by a scaling factor ($\alpha 3$), which is violated if $$t > t_{max} + \alpha 3;$$

5. $t$ versus an intermediate rising time between $t_p$, and $t_{max}$, weighted by F and tuned by scaling factors ($\alpha 4, \alpha 5$), which is violated if $$t > t_{ps} + (t_{max} - t_{ps})((1-F)(\alpha 4) + \alpha 5);$$

6. $t$ versus an intermediate falling time between $t_{max}$ and $t_{pe}$, weighted by F and tuned by scaling factors ($\alpha 6, \alpha 7$), which is violated if $$t > t_{max} + (t_{pe} - t_{max})((1-F)(\alpha 6) + \alpha 7);$$

7. $T_{am}$ versus $t_{max}$, tuned by a scaling factor ($\alpha 8$), which is violated if $$T_{am} > t_{max} + \alpha 8;$$

8. $T_{am}$ versus $t_{max}$, tuned by a scaling factor ($\alpha 9$), which is violated if $$T_{am} < t_{max} - \alpha 9;$$

9. $T_{am}$ versus an intermediate falling time between $t_{max}$ and $t_{pe}$, weighted by F and tuned by scaling factors ($\alpha 10, \alpha 11$), which is violated if $$T_{am} > t_{max} + (t_{pe} - t_{max})((1-F)(\alpha 10) + \alpha 11);$$

By way of example, the results of thresholds "1" and "5" may be combined in a Boolean AND operation to detect an increased risk of a peak violation where both $L(t)$ exceeds $P_p$ and $t$ exceeds a particular intermediate rising time between $t_p$, and $t_{max}$. Management processor 420 remains in the conservative state of observation and performs the threshold comparisons until an increased risk of a peak violation is detected.

Once an increased risk of a peak violation is detected, management processor 420 enters an active management state. In the active management state, management processor 420 takes initial countermeasures based on the level of increased risk (1335) and proceeds to Step 1320 for a more comprehensive risk assessment. In other embodiments, management processor 420 proceeds to the more comprehensive risk assessment without taking initial countermeasures. Initial countermeasures may include raising $P_t$ and/or shedding actual load at site 310. The magnitude of the initial countermeasures, if taken, correlates directly with the level of increased risk, which may depend on the number and/or the extent to which thresholds have been violated.

Returning once again to Step 1310, if $T_{as}$ is within $\Delta$ of $t_{ps}$, whether the actual peak on the day in question will be exceed the predicted peak or whether a peak violation is likely to occur is highly uncertain. In that event, management processor 420 does not take immediate countermeasures and enters a moderate state of observation wherein management processor 420 monitors at a high state of alert for an increased risk of peak violation using $L(t)$, $t$ and predicted load data (1340). The moderate state of observation operates similarly to the conservative state of operation, except that the frequency at which management processor 420 performs threshold comparisons is increased, the scaling factors used in the threshold comparisons may be set to values that cause the thresholds to be more easily violated and/or the set of threshold comparisons and Boolean operations used are liberalized to trigger quicker transition to the peak management state.

Management processor 420 remains in the moderate state of observation and performs the threshold comparisons until an increased risk of a peak violation is detected. Once an increased risk of a peak violation is detected, management processor 420 enters an active management state. In the active management state, management processor 420 takes initial countermeasures based on the level of increased risk (1335) and proceeds to Step 1320 for the more comprehensive risk assessment. In other embodiments, management processor 420 proceeds to the more comprehensive risk assessment without taking initial countermeasures. The magnitude of the initial countermeasures, if taken, correlates directly with the level of increased risk, which may depend on the number and/or the extent to which thresholds have been violated.

In some embodiments, different configurable intervals ($\Delta_1$, $\Delta_2$) may be used when determining whether the actual time is greater than a configurable interval before $t_{ps}$ and whether the actual time is greater than a configurable interval after $t_{ps}$.

Figure 14:
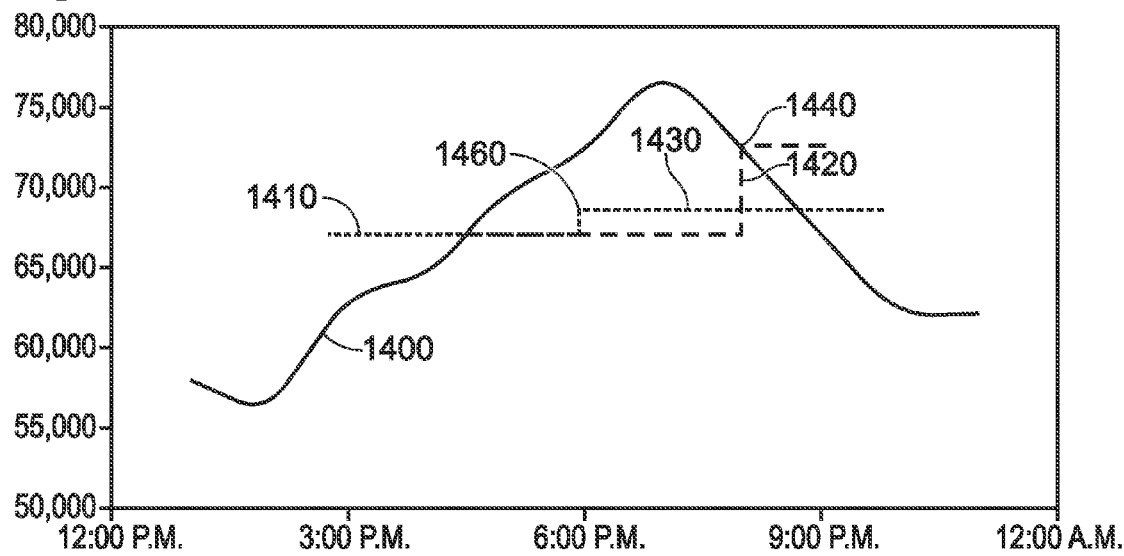
FIG. 14 is an exemplary load-time diagram showing the effects of a countermeasure in which target peak load is increased to prevent a spike in grid power use above the target peak load due to battery exhaustion.

FIG. 14 is an exemplary load-time diagram showing the effects of a countermeasure is taken at a time 1460 to set a new $P_t$ 1430 above an original $P_t$ 1410 to prevent a spike 1420 in grid power use above original $P_t$ 1410 due to battery exhaustion. Without the increase in $P_t$, the area swept-out by $L(t)$ 1400 while above original $P_t$ 1410 would exhaust the batteries at approximately 8:00 p.m., causing grid power use to spike to a level 1440 much higher than original $P_t$ 1410. However, once original $P_t$ 1410 is reset to new $P_t$ 1430, the area swept-out by $L(t)$ 1400 while above new $P_t$ 1430 does not exhaust the batteries, averting spike 1420.

It bears noting that $P_t$ may be increased more than once in a 24-hour period where indicated. Moreover, increasing $P_t$ may necessitate adjustment of the values of other predicted load data parameters (e.g., $t_{ps}$, $t_{max}$, $t_{pe}$, $BP_{av}$, $P_p$, F).

Figure 15:
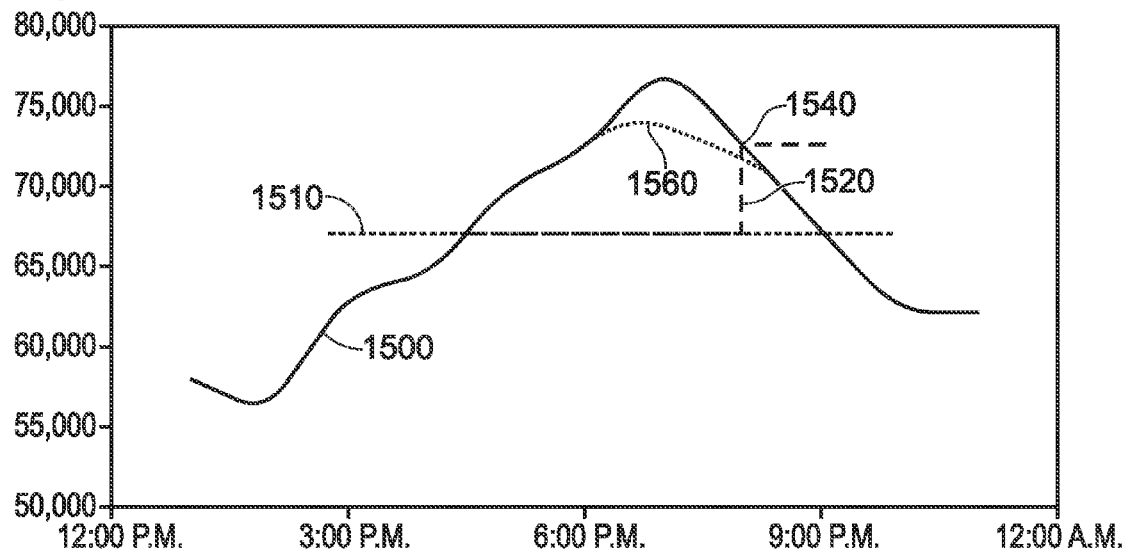
FIG. 15 is an exemplary load-time diagram showing the effects of a countermeasure in which actual load is decreased to prevent a spike in grid power use above the target peak load due to battery exhaustion.

FIG. 15 is an exemplary load-time diagram showing the effects of a countermeasure in which L(t) 1500 is decreased to prevent a spike 1520 in grid power use above $P_t$ 1510 due to a battery exhaustion. Without the decrease in L(t) 1500, the area swept-out by L(t) 1500 while above $P_t$ 1510 would exhaust the batteries at approximately 8:00 p.m., causing grid power use to spike to a level 1540 much higher than $P_t$ 1510. However, once L(t) 1500 is reduced through load shedding to a reduced actual load L(t)' 1560, the area swept-out by L(t) 1500 and later L(t)' 1560 while above $P_t$ 1510 does not exhaust the batteries, averting spike 1520.

Figure 16:
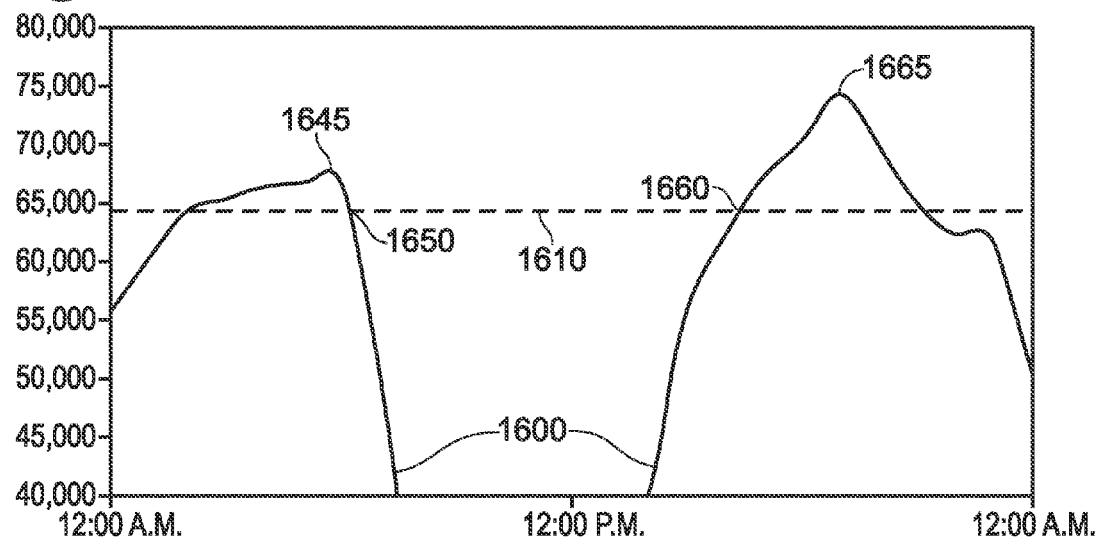
FIG. 16 is an exemplary load-time diagram showing a predicted load draw by the site that includes two peaks that are treated as separate peaks by the peak load management system.

Sometimes, the predicted load at site 310 on the "worst case" day will exhibit two or more distinct peaks in a single day. These peaks may be treated as separate peaks or as a single peak depending on whether there is ample time separating the peaks to fully recharge battery system 340. For example, FIG. 16 is an exemplary load-time diagram showing a predicted load 1600 drawn by site 310 that includes two peaks 1645, 1665 above $P_t$ 1610 that are treated as separate peaks by management system 420. These distinct peaks 1645, 1665 may be created, for example, by an expected reduction in predicted load 1600 during daylight hours due to power supplied by solar generator 330. Since there is ample time separating the two peaks 1645, 1665 to fully recharge battery system 340 between the first peak end time 1650 and the second peak start time 1660, the two peaks 1645, 1665 are treated as separate peaks by management system 420. Accordingly, aside from a common $P_t$ 1610, management system 420 generates for each peak and applies a separate set of predicted load data ($t_{ps}$, $t_{max}$, $t_{pe}$, $P_p$, $BP_{av}$, F).

Figure 17:
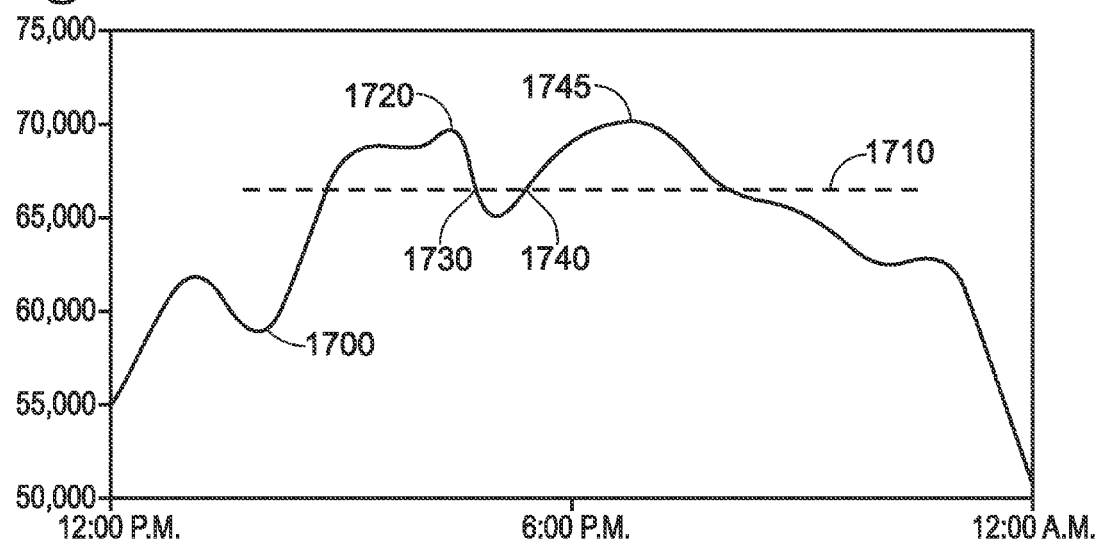
FIG. 17 is an exemplary load-time diagram showing a predicted load draw by the site that includes two peaks that are treated as a single peak by the peak load management system.

On the other hand, FIG. 17 is an exemplary load-time diagram showing a predicted load 1700 drawn by site 310 that includes two peaks 1720, 1745 above $P_t$ 1710 that are treated as a single peak by management system 420. In this scenario, there is insufficient time separating the peaks 1720, 1745 to fully recharge battery system 340 between the first peak end time 1730 and the second peak start time 1740. Thus, management system 420 effectively treats the two peaks 1720, 1745 as a single peak by ignoring the gap between the two peaks and generates for the single peak and applies a single set of predicted load data ($P_t$, $t_{ps}$, $t_{max}$, $t_{pe}$, $P_p$, $BP_{av}$, F).

Where management processor 420 initially treats two peaks as separate peaks but it becomes evident that there is insufficient time separating the peaks to fully recharge battery system 340, management processor 420 takes an immediate countermeasure that increases $P_t$. The magnitude of the increase in $P_t$ is determined using the predicted load data for each peak based on the relative sizes of the peaks and their separation in time. Management processor 420 then merges the two peaks into a single peak characterized by $t_p$, for the earlier peak, $t_{pe}$ for the later peak, the higher of the $P_p$ values for the earlier and later peak, the $t_{max}$ corresponding to the higher of the $P_p$ values and F for the later peak.

It will be appreciated by those of ordinary skill in the art that the invention can be embodied in other specific forms without departing from the spirit or essential character hereof. The present description is thus considered in all respects to be illustrative and not restrictive. The scope of the invention is indicated by the appended claims, and all changes that come with in the meaning and range of equivalents thereof are intended to be embraced therein.

What is claimed is:

1. In a peak load management system comprising a battery system configured to store power for a customer of an electric utility and discharge stored power when actual load by the customer exceeds a target peak load for the customer and a peak load management processor operatively coupled with the battery system, a peak load management method, comprising:
   computing, by the peak load management processor, a predicted time when actual load is predicted to rise above the target peak load;
   detecting, by the peak load management processor, a detected time when actual load rises above the target peak load;
   determining, by the peak load management processor, whether the detected time precedes the predicted time by more than a configurable interval;
   entering, by the peak load management processor, an active management state in response to determining that the detected time precedes the predicted time by more than the configurable interval; and while in the active management state:
   implementing, by the peak load management processor, one or more initial countermeasures having a magnitude selected to correlate with an amount of time by which the detected time precedes the predicted time;
   computing, by the peak load management processor, a risk of a spike in grid power usage above the target peak load due to battery exhaustion;
   implementing, by the peak load management processor, one or more additional countermeasures having a magnitude selected to correlate with a level of the risk; and
   determining, by the peak load management processor, when actual load falls below the target peak load by a particular power margin, whereupon the active management state is exited.

2. The peak load management method of claim 1, wherein the risk is computed using actual load, a rate of change of actual load and an amount of stored power in the battery system.

3. The peak load management method of claim 1, wherein the risk includes a probability component estimating a likelihood of the spike.

4. The peak load management method of claim 1, wherein the risk includes a severity component estimating an amplitude of the spike.

5. The peak load management method of claim 1, wherein the countermeasures include increasing the target peak load.

6. The peak load management method of claim 1, wherein the countermeasures include shedding actual load.

7. The peak load management method of claim 1, further comprising, when the detected time precedes the predicted time by less than the configurable interval, monitoring by the peak load management processor at a high state of alert without implementing countermeasures.

8. The peak load management method of claim 1, further comprising, when the detected time follows the predicted time monitoring by the peak load management processor at a low state of alert without implementing countermeasures.

9. A peak load management system, comprising:
   a battery system configured to store power for a customer of an electric utility and discharge stored power when actual load by the customer exceeds a target peak load for the customer; and
   a peak load management processor operatively coupled with the battery system configured to compute a predicted time when actual load is predicted to rise above the target peak load, detect a detected time when actual load rises above the target peak load and determine whether the detected time precedes the predicted time by more than a configurable interval, further configured in response to determining that the detected time precedes the predicted time by more than the configurable interval to enter an active management state and while in the active management state implement one or more initial countermeasures having a magnitude selected to correlate with an amount of time by which the detected time precedes the predicted time, compute a risk of a spike in grid power usage above the target peak load due to battery exhaustion, implement one or more additional countermeasures having a magnitude selected to correlate with a level of the risk and determine when actual load falls below the target peak load by a particular power margin whereupon the active management state is exited.

10. The peak load management system of claim 9, wherein the risk is computed using actual load, a rate of change of actual load and an amount of stored power in the battery system.

11. The peak load management system of claim 9, wherein the risk includes a probability component estimating a likelihood of the spike.

12. The peak load management system of claim 9, wherein the risk includes a severity component estimating an amplitude of the spike.

13. The peak load management system of claim 9, wherein the countermeasures include increasing the target peak load.

14. The peak load management system of claim 9, wherein the countermeasures include shedding actual load.

15. The peak load management system of claim 9 wherein, when the detected time precedes the predicted time by less than the configurable interval, the peak load management processor is configured to monitor at a high state of alert without implementing countermeasures.

16. The peak load management system of claim 9 wherein, when the detected time follows the predicted time, the peak load management processor is configured to monitor at a low state of alert without implementing countermeasures.

* * * * *